(12) United States Patent
Morales et al.

(10) Patent No.: US 7,573,589 B2
(45) Date of Patent: Aug. 11, 2009

(54) METHODS AND SYSTEMS FOR AUTOMATED COLOR PROOFING

(75) Inventors: Javier A. Morales, Irondequoit, NY (US); Michael E. Farrell, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 775 days.

(21) Appl. No.: 11/124,352

(22) Filed: May 9, 2005

(65) Prior Publication Data
US 2006/0250629 A1 Nov. 9, 2006

(51) Int. Cl.
G06F 3/12 (2006.01)
(52) U.S. Cl. ...................... 358/1.13; 358/1.15; 358/501
(58) Field of Classification Search ................ 358/1.15, 358/1.13, 515, 504; 101/484
See application file for complete search history.

(56) References Cited

U.S. PATENT DOCUMENTS

| | | | | |
|---|---|---|---|---|
| 6,607,258 B2 * | 8/2003 | Jodra et al. | ................... | 347/15 |
| 7,032,988 B2 * | 4/2006 | Darby et al. | ................... | 347/14 |
| 7,227,666 B1 * | 6/2007 | MacLeod | ................... | 358/1.9 |

OTHER PUBLICATIONS

Tapp, Eddie; "ICC Profiles"; http://www.eddietapp.com/PDFs/ICC7.pdf.; Dec. 2002.
"The role of ICC profiles in a colour reproduction system"; International Color Consortium: White Paper #7; http://www.color.org/ICC_white_paper_7_role_of_ICC_profiles.pdf.
"Glossary of terms"; International Color Consortium: White Paper #5; http://www.color.org/ICC_white_paper5glossary.pdf.
King, J. C.; "Why Color Management"; http://www.color.org/whycolormanagement.pdf.
Fraser, B. et al.; "Color Management Excerpt: ICC-color management explained", *PEI*; pp. 38-42; Sep./Oct. 2003; http://www.peimag.com/pdf/pei03/pei0910_03/fraserpei0910_03.pdf.
Binder, Kate; "PDF Workflow in Action"; *PEI*; pp. 44-48; Feb. 2001; http://www.peimag.com/pdf/pei01/pei0201/binderpei0201.pdf.

* cited by examiner

*Primary Examiner*—King Y Poon
*Assistant Examiner*—William C Storey
(74) *Attorney, Agent, or Firm*—Oliff & Berridge, PLC

(57) ABSTRACT

Offline proofing systems and methods for color image processing may include receiving a digitized image document to be press printed in a job, determining job status as corresponding to one of a color managed proof and a color managed press, installing a proofer profile as an output profile and a press profile as a simulation profile in response to the job status corresponding to the color managed proof, printing the job by the proof printer as a proof copy in response to the color managed proof, installing the press profile as an output profile and discarding the simulation profile in response to the job status corresponding to the color managed press, and printing the job by the press printer as a press copy in response to the color managed press. The color managed press may be based on a customer contract approval. The proofer profile may correspond to a proof printer and the press profile may correspond to a press printer. These systems and methods may further provide the input file in an RGB space to be translated through a profile connection space to at least one of the simulation profile and the output profile in CMYK space.

20 Claims, 2 Drawing Sheets

METHODS AND SYSTEMS FOR AUTOMATED COLOR PROOFING

BACKGROUND

This invention relates to automated proofing for color image processing.

Commercial-scale production of color documents includes a proofing step in which a pre-production "proof" copy is printed. The proofing process verifies that the proof copy corresponds to the expected print quality prior to performing the production "press" print, which may include several batches or copies.

Proofs originated in commercial printing when printers used lithographic (for publication), gravure (for package printing) and flexographic (long-run) processes. The proof provides an economical preview print for customer review before committing effort and materials in creating printing plates, inking the press and adjusting ink and water balance. Current technology, such as a low-cost color printers, enables designers and photographers to make proofs.

Proofs include two types, depending on their use: contract proofs and design proofs, also known as "comps" or pre-proofs. Contract proofs show appearance of an accurately reproduced image when printed, for the customer to approve before press production. Design proofs show the early stage of a print job, generally for layout, position and general appearance, with less emphasis placed on accurate color, except for final comps.

The characteristics of a device may be described by a color profile. Color devices typically operate within a device-dependent color space that represents a mapping coordinate system. The color profile may describe a relationship between the actual color produced in a native color space and an abstract (device-independent) color space. A device-specific color profile may correspond to a generalized class of devices, a generic factory profile from the manufacturer, or a custom profile based on calibration for a particular device.

These profiles may define the boundaries of the gamut, which may represent the total color volume capable of being rendered by the device to which the color profile corresponds. The gamut of one device may differ considerably from the gamut of another device. A proof printer, for example, may employ a larger gamut than a typical press or production printer.

An imaging workflow may represent a path from an input (image capture or receiver) device from which an image may originate digitally to an output (printer or display) device to which the image may be respectively printed or displayed. The image may be encoded in digital form for rendering. The input device may be represented by an image capture device, such as a scanner or a digital camera, or by a file receiver device that maintains a preexisting image. The output device may be represented by a printer (as an output device) or by a screen monitor (as a display device).

Color management may include obtaining color profiles that describe all devices employed between the input and output devices. Combining these profiles into a workflow may include transformation from one color space used for a first color profile to another color space used for a second color profile through a profile connection space (PCS).

PCS represents a standard or reference color space that may provide an unambiguous connection between input and output color spaces. PCS may be device-independent, also called abstract, such as CIE XYZ (1931) developed by the internationally recognized Commission Internationale de l'Eclairage (CIE), to produce an International Color Consortium (ICC®) profile. The workflow may employ PCS to link across device-dependent color spaces.

Transformation from one device-dependent color space to another device-dependent color space may cause loss of color information from non-coextensive gamuts or ambiguities due to different interpretations of one or more colors between devices. A rendering intent may be selected to specify which parameters to compromise when mapping from input to output color spaces.

A color management module (CMM), also called a color engine, may be used to assign a profile to an image or a job, and also to perform an actual transformation from the input color space to the output color space. The CMM may be incorporated in the device or elsewhere in the workflow. Color management describes the color of pixels and converts their values to maintain consistent color across various devices.

An image capture device may convert a source image into digital image data and assign an input profile describing information for converting from the gamut of the image capture device to PCS. An image output or destination device, frequently including a digital front end (DFE) for processing received image data, may render digital images to hardcopy or softcopy media. The DFE may include a raster image processor (RIP), such as for a digital color press. The RIP may convert postscript and portable document format (PDF) files into raster images that may be submitted to the color press or to a digital plate maker for imaging.

Some image devices (for input and display), such as digital cameras and liquid crystal diode flat-screen monitors, may use an additive (e.g., primary-based) color space, such as red-green-blue (RGB) coordinates. Printers typically may employ a subtractive (absorbent) color space, such as cyan-magenta-yellow-black (CMYK) coordinates.

Because the RGB and CMYK color spaces may correspond to a specific device or hardware model, the ranges of these respective spaces may not cover the same gamut or region, and thereby may preclude complete mapping correspondence between the RGB and CMYK spaces. Conversion of color spaces from the typically larger RGB gamut to the typically smaller CMYK gamut may yield losses in color mapping information.

PCS may provide a common interface between input, display and output devices to allow their respective profile transforms to be decoupled from each other. Converting an image source to a destination device color space for printing may entail mapping from the capture RGB coordinates to PCS and then mapping from PCS to CMYK printing coordinates. The ICC profile may provide information on converting from a device-dependent color space to PCS.

Under inline proofing, the same color printer device that prints the proof also prints the final print job. Establishing a match between the proof and the final print is performed based on the print-to-print variation of the color printer.

Under offline printing, a pre-production proofing device prints the contract proof, and subsequently a press (for commercial production printing) prints the final print run. Establishing a close match between the contract proof and the final print may involve a procedure for obtaining similar colors in prints produced from separate devices. Each printer may operate over a gamut, typically mapped in coordinates of a CMYK color space.

One technique for offline printing comparisons uses a lowest common denominator in a CMYK color space, such as Specifications Web Offset Publications (SWOP®) under U.S. Web Coated v. 2. However, SWOP employs a restricted gamut considered inadequate for some professional applications. For an image that includes colors not encompassed by a SWOP-profiled printer, the color boundaries may be truncated by the printer.

Another technique uses an RGB workflow with ICC profiles. The offline printing comparison using the ICC profile-based RGB workflow enables the proofing device to match a greater variety of the high-production press, because larger color gamuts are available than in SWOP color space. This technique may benefit digital production presses, which generally use higher-quality inks than offset presses, and hence may have a larger gamut than offset presses.

Prior to ICC color management, proprietary software were used to convert from an input device-dependent color space, such as RGB, to an output device-dependent color space, such as CMYK. The ICC color management workflow uses open-architecture formats, and may employ a device-independent color reference space to serve as PCS.

The workflow may provide a process for transforming color spaces for received and transferred image data to a device-independent PCS for the ICC profile. An output device receiving the image data may also receive, through the workflow, the ICC profile to correctly process the image data.

The typical RGB workflow uses several profiles for translating between the proofing and production devices. An input profile may describe the source or image-receiving device (e.g., scanner, camera) used to digitize the original image. An output profile may describe either a proofing device for producing a proof of the image or a production press for producing printed copies of the image. A simulation profile describes an emulation device that simulates the production device.

Conventionally, to establish a match between the offline proofing device and the production device, a user must embed the input profile (from the image digitizer) used to digitize the images to be processed, and embed the output profile (from the printing device to be used). For example, the input profile may represent the digitized image data together with the source profile of the image capture device. Optionally, the user may embed a simulation profile that describes the production device that the proof printer will emulate.

To enable an offline proofing device to match the press, the conventional technique requires input profiles for all images to have embedded therein: the input profile, a proofing device profile from the proofing device as the output profile, and a press profile from the press as the simulation profile. A print job may then be executed on the proofing device. Following customer approval of the proof print, the user must reprint the print job from the input profile, delete the simulation profile and replace the output profile with the press profile that corresponds the press, rather than the proofing device.

SUMMARY

The conventional arrangement exhibits a disadvantage of requiring several profiles to be distributed and maintained for each workstation that controls the printing processes. In addition, the source image must be retrieved for the production printer after the proof has been approved. In many establishments, such a step requires returning to the prepress department. By returning to the prepress for reprinting, the workflow requires additional time from skilled process operators.

Due to the necessity for retrieving the source image, errors may be introduced as a consequence of changed machine configuration, or because the user must verify all job parameters that were selected are consistent with the corresponding parameters for the proof. Under the conventional workflow, the user must verify that the profiles are properly embedded and that the proper changes to the simulation and output profiles are performed. If the print job has been processed by other workflow components before being sent to the production press, the user must verify that the print job traverses the same path through all the workflow components, and that the processing is conducted in the same manner throughout.

Various exemplary embodiments provide methods and systems for offline proofing for color image processing. Exemplary methods may include receiving a digitized image document to be press printed in a job, determining job status as corresponding to one of a color managed proof and a color managed press, installing a proofer profile as an output profile and a press profile as a simulation profile in response to the job status corresponding to the color managed proof, printing the job by the proof printer as a proof copy in response to the color managed proof, installing the press profile as an output profile and discarding the simulation profile in response to the job status corresponding to the color managed press, and printing the job by the press printer as a press copy in response to the color managed press. The color managed press may be based on a customer contract approval. The proofer profile may correspond to a proof printer and the press profile may correspond to a press printer.

Exemplary offline proofing methods and systems may further provide that the input profile in an RGB space is translated into a profile connection space to one of the simulation profile and the output profile in a CMYK space.

BRIEF DESCRIPTION OF THE DRAWINGS

Various details are described below with reference to the following figures, wherein.

DETAILED DESCRIPTION OF EMBODIMENTS

The following detailed description refers to automated offline color proofing. The exemplary methods and systems may refer to, for example, RGB workflow processes, etc., for sake of clarity and familiarity. However, it should be appreciated that the principles described herein, may equally be applied to any known or later-developed workflow processes, beyond the examples specifically discussed herein.

Workflow profiles for proofing may include the source profile (for the image capture device), the destination profile (for the press or the proofing device) and the simulation profile (for the proofing device to simulate the press). The image data may describe the color coordinates corresponding to individual pixels that represent the image. The source profile may conform to a specific input device, such as a scanner profile or a digital camera profile from which the image data are captured or obtained.

The destination profile may describe the device to which the image data will be output, such as an inkjet printer (for proofing) or a digital press (for production). The simulation profile may describe, based on the desired output device, how the image should appear for a proof print from a proofing device emulating the press.

The output profile may characterize color parameters for an inkjet printer or other low-cost print device. The simulation profile may characterize color parameters for a printing press, for the colors that are to be matched. A display profile may characterize color parameters for on-screen viewing on a monitor.

Figure 1:
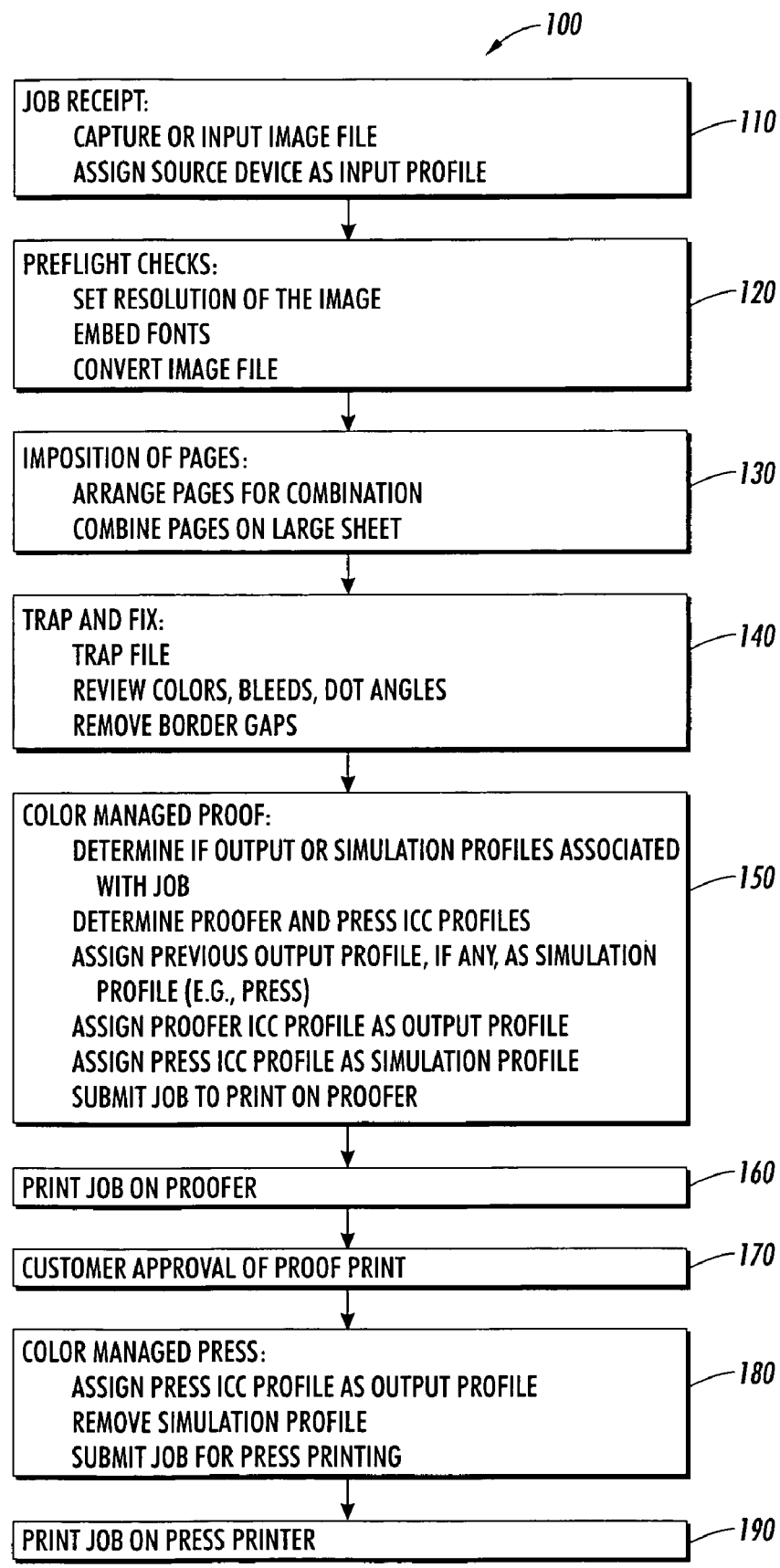
FIG. 1 shows an exemplary flowchart for an automated color workflow process for offline printing.

FIG. 1 shows an exemplary flowchart for automatic processing of ICC workflow proofs in an automated prepress workflow. A workflow 100 may begin with receipt of a print job in step S110. The job receipt may include capture of an image into an image file or input of an image file. The job receipt may also include assigning the source device as an input profile.

The workflow 100 continues to conduct preflight checks in step S120. The checks may include setting the image's resolution, embedding fonts into the image file, and/or conversion of the image file to a standard format (e.g., PDF file). The workflow 100 continues to imposition of pages in step S130. The imposition may include arranging pages for combination onto a layout of a large sheet, followed by the combination of the image files to the layout. The workflow 100 may further include trapping and fixing of the images in step S140. These operations may include trapping the image file, reviewing the colors, bleeds and dot angles, and reviewing the image to remove border gaps at the interface edges. Those of ordinary skill in the art will recognize that steps S120-S140 are optional with respect to implementing the exemplary embodiments.

The workflow 100 continues to color managed proof in step S150. The proof may include several functions that include (a) determining the availability of the output or simulation profiles associated with the job; (b) determining the proofer and press ICC profiles; (c) assigning the previous output profile, if any, as the simulation profile, such as the press printer; (d) assigning the proofer ICC profile as the output profile; and (e) assigning the press ICC profile as the simulation profile. Subsequently, the job may be submitted to print on the proofer or proof printer.

The workflow 100 continues to print the job on the proofer in step S160 to be shown to the customer for approval. After the customer approves the proof print in step S170, the job is marked contract approved for the final press print. The workflow 100 continues to the color managed press in step S180. The press ICC profile may be assigned as the output profile, with the simulation profile removed. Then the print job may be submitted for press printing. The workflow 100 continues to print the job on the press printer in step S190. The workflow then terminates.

The flowchart 100 may alternatively be implemented in a DFE. Additional steps may require proofers to be added to the DFE and submitting the print job to the DFE to maintain a hold state before printing. With the DFE implementation, the user may select the job and request a color managed proof before proceeding to steps S150 through S190.

Figure 2:
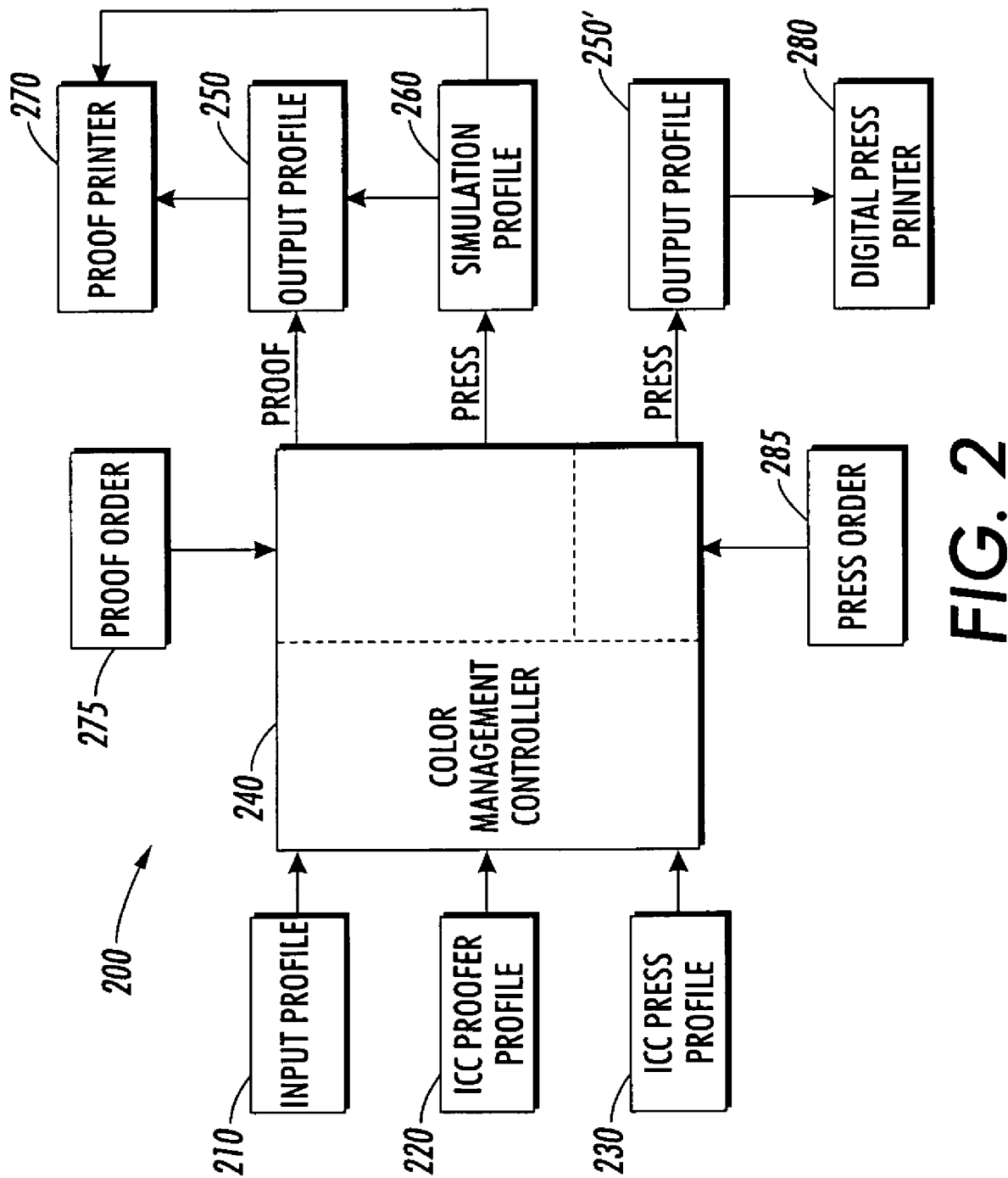
FIG. 2 shows an exemplary block diagram for the automated color workflow process in offline printing.

FIG. 2 shows an exemplary block diagram as a printing system 200. The block diagram may include an input profile 210 corresponding to a source device, an ICC proofer profile 220 and an ICC press profile 230. A color management controller 230 for the printing system 200 may receive the input profile 210 as well as the ICC profiles 220, 230.

In response to a color managed proof order 275, the controller 230 may assign the ICC proofer profile 220 to an output profile 250 and the ICC press profile 230 to a simulation profile 260. The output profile 250 may be used to process a proof printing operation on the proof printer or proofer 270 that corresponds to the ICC proof profile 220.

In response to a color managed press order 285 after customer approval in step S175, the controller may assign the ICC press profile 230 to the output profile 250' and remove the simulation profile 260. The output profile 250' may be used to process a press printing operation on the press printer 280 that corresponds to the ICC press profile 230.

The printing system 200 may be, in various exemplary embodiments, implemented on a programmed general-purpose computer. However, the printing system 200 may also be implemented on a special purpose computer, a programmed microprocessor or microcontroller in peripheral integrated circuits, an ASIC or other integrated circuit, a digital signal processor, a hard wired electronic or logic circuit such as a discrete element circuit, a programmable logic device such as a PLD, PLA, FPGA or PAL, or the like. In general, any device, capable of implementing a finite state machine that is in turn capable of implementing the flowchart shown in FIG. 2 may be used to implement the printing system 200.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, which are also intended to be encompassed by the following claims.

What is claimed is:

1. A method of offline proofing for color image processing, comprising:

receiving a digitized image document to be press printed as a job;

determining job status as corresponding to one of a color managed proof and a color managed press, wherein the color managed press is based on a customer contract approval;

installing a proofer profile as an output profile;

automatically, without user intervention, installing a press profile to a simulation profile in response to the job status corresponding to the color managed proof based on a previously installed output profile, the proofer profile corresponding to a proof printer and the press profile corresponding to press printer;

printing the job by the proof printer as a proof copy in response to the job status corresponding to the color managed proof;

installing the press profile as the output profile and discarding the simulation profile in response to the job status corresponding to the color managed press; and printing the job by the press printer as a press copy in response to the job status corresponding to the color managed press.

2. The method according to claim 1, further comprising:
accepting the press copy; and
changing a state of the output profile as being accepted.

3. The method according to claim 1, further comprising:
translating data of an input profile of a RGB space of an image source device into at least one of the simulation profile and the output profile of a CMYK space.

4. The method according to claim 3, wherein translating the data of the input profile further includes translating the data of the input profile to a profile connection space.

5. The method according to claim 4, wherein the profile connection space is an ICC color space.

6. The method according to claim 1, further comprising:
obtaining approval by a customer for the proof copy prior to installing the press profile to the output profile.

7. The method according to claim 1, further comprising in order:
setting the digitized image document;
embedding fonts into the digitized image document;
converting the digitized image document into a standard format;

arranging and combining pages of the digitized image document onto a layout of a large sheet;

trapping the digitized image document; and removing border gaps of the digitized image document at interface edge.

8. A color management system for offline proofing of a processed color image, comprising:

a controller that determines job status as corresponding to one of a color managed proof and a color managed press and that installs a plurality of color profiles for a job, the color profiles including at least an output profile, the color managed press based on a customer contract approval;

a production printer having a press profile, wherein the production printer prints the production copy in response to the controller installing the press profile as the output profile; and a proof printer that prints a proof copy in response to the controller automatically, without user invention, installing a proofer profile as the output profile and installing the press profile as a simulation profile based on a previously installed output file.

9. The system according to claim 8, further comprising:

an acceptance selector that accepts the production copy; and a profile editor that changes a state of the output profile as being accepted.

10. The system according to claim 8, further comprising:

an image capture device that receives and digitizes a document to be printed as the job; and a translation processor that translates data of an input profile of a RGB space into at least one of the simulation profile and the output profile of a CMYK space.

11. The system according to claim 10, wherein the input profile of the RGB space corresponds to a profile connection space.

12. The system according to claim 11, wherein the profile connection space is an ICC color space.

13. The system according to claim 8, wherein the production printer comprises a Xerographic device.

14. The system according to claim 8, wherein the proof printer comprises a Xerographic device.

15. A computer-readable medium having executable software code for offline proofing for color image processing, the software code comprising:

instructions for receiving a digitized image document to be press printed as a job;

instructions for determining job status as corresponding to one of a color managed proof and a color managed press, wherein the color managed press is based on a customer contract approval;

instructions for installing a proofer profile as an output profile;

instructions for automatically, without user intervention, installing a press profile to a simulation profile in response to the job status corresponding to the color managed proof based on a previously installed output file, the proofer profile corresponding to a proof printer and the press profile corresponding to a press printer;

instructions for printing the job by the proof printer as a proof copy in response to the job status corresponding to the color managed proof;

instructions for installing the press profile as the output profile and discarding the simulation profile in response to the job status corresponding to the color managed press; and instructions for printing the job by the press printer as a press copy in response to the job status corresponding to the color managed press.

16. The medium according to claim 15, further comprising:

instructions for accepting the press copy; and instructions for changing a state of the output profile as being accepted.

17. The medium according to claim 15, further comprising:

instructions for translating data of an input profile of a RGB space into at least one of the simulation profile and the output profile of a CMYK space.

18. The medium according to claim 17, wherein instructions for translating data of the input profile further includes instructions for translating data of the input profile to a profile connection space.

19. The medium according to claim 18, wherein the profile connection space is an ICC color space.

20. The medium according to claim 15, further comprising:

instructions for obtaining approval by a customer for the proof copy prior to installing the press profile to the output profile.

* * * * *